United States Patent
Brahmi et al.

(10) Patent No.: US 9,699,692 B2
(45) Date of Patent: Jul. 4, 2017

(54) CELLULAR NETWORK CONTROL OF CHANNEL ALLOCATION FOR VEHICLE-TO-VEHICLE COMMUNICATION

(71) Applicant: Telefonaktiebolaget L M Ericsson (publ), Stockholm (SE)

(72) Inventors: Nadia Brahmi, Aachen (DE); Konstantinos Dimou, San Francisco, CA (US); Joachim Sachs, Bromma (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/786,125

(22) PCT Filed: Apr. 22, 2013

(86) PCT No.: PCT/EP2013/058269
§ 371 (c)(1),
(2) Date: Oct. 21, 2015

(87) PCT Pub. No.: WO2014/173429
PCT Pub. Date: Oct. 30, 2014

(65) Prior Publication Data
US 2016/0073298 A1    Mar. 10, 2016

(51) Int. Cl.
*H04B 7/00* (2006.01)
*H04J 3/00* (2006.01)
(Continued)

(52) U.S. Cl.
CPC ........ *H04W 36/0011* (2013.01); *H04W 4/005* (2013.01); *H04W 36/0072* (2013.01);
(Continued)

(58) Field of Classification Search
None
See application file for complete search history.

(56) References Cited

U.S. PATENT DOCUMENTS

2006/0084438 A1* 4/2006 Kwon ............... H04W 36/30
455/436
2009/0296680 A1* 12/2009 Suzuki ............. H04W 72/0406
370/342
(Continued)

FOREIGN PATENT DOCUMENTS

EP    2 129 007 A1    12/2009
JP    2012-028982 A    2/2012
(Continued)

OTHER PUBLICATIONS

International Search Report and Written Opinion of the International Searching Authority, Application No. PCT/EP2013/058269, Mar. 24, 2014.
(Continued)

*Primary Examiner* — Moustapha Diaby
(74) *Attorney, Agent, or Firm* — Sage Patent Group

(57) ABSTRACT

A node of a cellular network detects entry of a vehicle-to-vehicle communication device into a cell of the cellular network. The node allocates resources to the vehicle-to-vehicle communication device, and sends channel information to the vehicle-to-vehicle communication device. The channel information can be included in a handover command to the vehicle-to-vehicle communication device. The channel information indicates the allocated resources. The vehicle-to-vehicle communication device uses the allocated resources for sending of vehicle-to-vehicle communication messages.

20 Claims, 9 Drawing Sheets

(51) Int. Cl.
*H04W 4/00* (2009.01)
*H04W 36/00* (2009.01)
*H04W 72/00* (2009.01)
*H04W 72/04* (2009.01)
*H04W 76/04* (2009.01)

(52) U.S. Cl.
CPC ....... *H04W 72/04* (2013.01); *H04W 72/0453* (2013.01); *H04W 76/043* (2013.01)

(56) References Cited

U.S. PATENT DOCUMENTS

| | | | | |
|---|---|---|---|---|
| 2010/0081446 | A1* | 4/2010 | Ushiki | H04W 56/0015 455/450 |
| 2012/0163275 | A1* | 6/2012 | Kim | G08G 1/092 370/312 |
| 2012/0314615 | A1 | 12/2012 | Nagai et al. | |
| 2013/0100827 | A1* | 4/2013 | Oliveira | H04L 12/26 370/248 |

FOREIGN PATENT DOCUMENTS

| | | |
|---|---|---|
| JP | 2012-151887 A | 8/2012 |
| WO | WO 2007/015066 A2 | 2/2007 |
| WO | WO 2008/114435 A1 | 9/2008 |
| WO | WO 2011/109027 A1 | 9/2011 |
| WO | WO 2011/109941 A1 | 9/2011 |
| WO | WO 2013/006647 A1 | 1/2013 |
| WO | WO 2013/013412 A1 | 1/2013 |
| WO | WO 2014/048486 A1 | 4/2014 |

OTHER PUBLICATIONS

3GPP, Technical Specification, "3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331 V11.3.0 (Mar. 2013), 344 pp.

3GPP, Technical Specification, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2; (Release 11)", 3GPP TS 36.300 V11.5.0 (Mar. 2013), 209 pp.

ETSI, "Intelligent Transport Systems (ITS); Vehicular Communications; Basic Set of Applications; Part 3: Specifications of Decentralized Environmental Notification Basic Services", ETSI TS 102 637-3 v1.1.1 (Sep. 2010), 46 pp.

IEEE P802.11p/D11.0, Draft Amendment for Wireless Access in Vehicular Environments (WAVE), Apr. 2010.

M. Sepulcre, J. Mittag and P. Santi, "Congestion and Awareness Control in Cooperative Vehicular Systems", in the Proceedings of the IEEE, vol. 99, No. 7, 2011, pp. 1260-1279.

Office Action and English language summary, JP Application No. 2016-508022, Jan. 27, 2017.

* cited by examiner

CELLULAR NETWORK CONTROL OF CHANNEL ALLOCATION FOR VEHICLE-TO-VEHICLE COMMUNICATION

CROSS REFERENCE TO RELATED APPLICATION

This application is a 35 U.S.C. §371 national stage application of PCT International Application No. PCT/EP2013/058269, filed on Apr. 22, 2013, the disclosure and content of which is incorporated by reference herein in its entirety. The above-referenced PCT International Application was published in the English language as International Publication No. WO 2014/173429 A1 on Oct. 30, 2014.

TECHNICAL FIELD

The present invention relates to methods for controlling vehicle-to-vehicle communication and to corresponding devices.

BACKGROUND

In vehicular transport and traffic management, it is known to use Intelligent Transport System (ITS) applications for supporting drivers. In this way, traffic safety can be improved by providing the drivers with information which allows for making smarter decisions. Such ITS applications may involve transmitting information between different vehicles, e.g., in the form of a Cooperative Awareness Message (CAM). The information may be used for providing a warning or guidance to the driver, e.g., in the form of an emergency vehicle warning, an intersection collision warning, a slow vehicle warning, or a motorcycle approaching indication. The information may be transmitted using a radio technology for vehicle-to-vehicle (V2V) communication, e.g., as specified by the IEEE 802.11p standard, also referred to as WAVE (Wireless Access in Vehicular Environments). According to the IEEE 802.11p standard, a wireless ad-hoc network may be formed between different vehicles.

CAMs are messages which are typically periodically broadcast by a vehicle to inform nearby vehicles about the current status of the vehicle. CAMs may for example be used for transmitting the current geographical position, speed, and/or basic attributes of the vehicle. A vehicle may receive CAMs from other vehicles and utilize the information provided in the CAMs for supporting its operator, e.g., by providing a warning or other guidance.

More details on CAMs can be found in ETSI TS 102 637-3 "Intelligent Transport Systems (ITS); Vehicular Communications; Basic Set of Applications; Part 2: Specification of Cooperative Awareness Basic Service". Here, a generation of cooperative applications is described, which are based on the IEEE 802.11p specifications. The traffic model for the transmission of such CAM messages is specified to use periodic broadcast traffic consisting of approx. 500 payload bytes with a repetition rate 5-10 Hz and event-driven broadcast traffic consisting of approx. 500 payload bytes. Both traffic types may exist at the same time.

The ad-hoc network according to IEEE 802.11p is a contention based system, in which different V2V communication devices compete for access to the same radio channel. Accordingly, there is also a risk of colliding access attempts by different V2V communication devices. Such collisions may in turn result in delays until a V2V communication device successfully gains access to the radio channel.

Accordingly, there is a need for techniques which allow for achieving reliable and low latency V2V communication.

SUMMARY

According to an embodiment of the invention, a method of controlling V2V communication is provided. According to the method, a V2V communication device connects to a cell of a cellular network. From the cellular network, the V2V communication device receives channel information. The channel information indicates resources which are allocated to the V2V communication device for sending of V2V communication messages. In accordance with the received channel information, the V2V communication device controlling transmission of V2V communication messages.

According to a further embodiment of the invention, a method for controlling V2V communication is provided. According to the method, a node of a cellular network detects entry of a V2V communication device into a cell of the cellular network. The node further allocates resources to the V2V communication device. The resources are allocated for sending of V2V communication messages by the V2V communication device. Further, the node sends channel information to the V2V communication device. The channel information indicates the allocated resources.

According to a further embodiment of the invention, a device for V2V communication is provided. The device comprises a first radio interface for communication with a cellular network and a second radio interface for V2V communication. Further, the device comprises at least one processor. The at least one processor is configured to receive, via the first radio interface, channel information from the cellular network. The channel information indicates resources which are allocated to the V2V communication device for sending of V2V communication messages. Further, the at least one processor is configured to control, in accordance with the received channel information, transmission of V2V communication messages via the second radio interface.

According to a further embodiment of the invention, a node for a cellular network is provided. The node comprises an interface and at least one processor. The at least one processor is configured to detect entry of a V2V communication device into a cell of the cellular network. Further, the at least one processor is configured to allocate resources to the V2V communication device. This allocation is for sending of V2V communication messages by the V2V communication device. Further, the at least one processor is configured to send, via the interface, channel information to the V2V communication device. The channel information indicates the allocated resources.

DETAILED DESCRIPTION OF EMBODIMENTS

Figure 1:
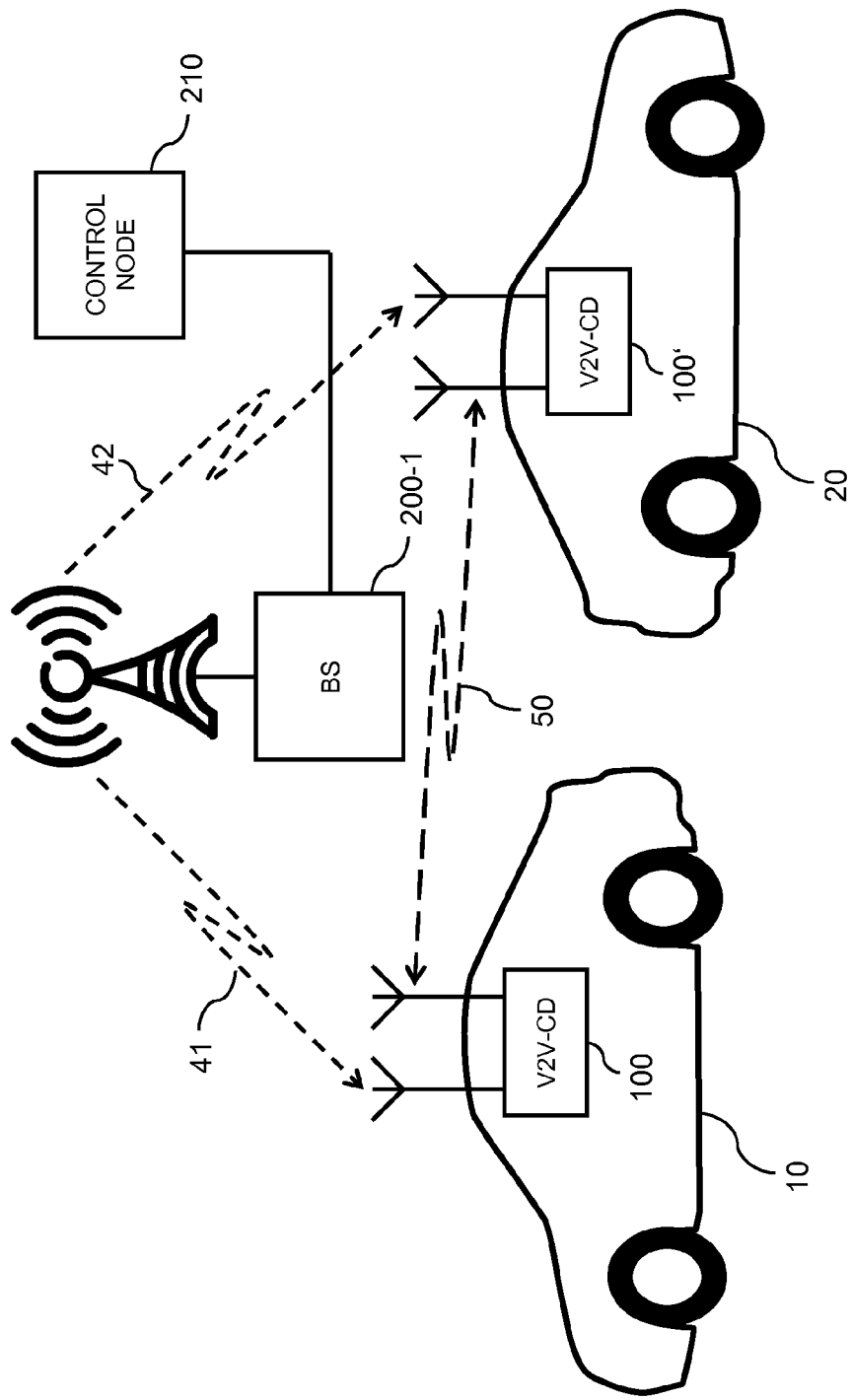
FIG. 1 schematically illustrates a V2V communication scenario in which concepts according to an embodiment of the invention may be applied.

In the following, concepts according to embodiments of the invention will be explained in more detail by referring to the accompanying drawings. The illustrated concepts relate to controlling V2V communication between vehicle-based V2V communication devices. The V2V communication may be used to implement an ITS application, e.g., based on the transmission of CAMs between vehicles.

In the illustrated concepts, it is assumed that V2V communication is based on one or more radio technologies, e.g., an ad-hoc WLAN (Wireless Local Area Network) according to IEEE 802.11p, or LTE Device-to-Device (D2D), and that the V2V communication devices are further provided with access to a cellular network, e.g., as specified by 3GPP (Third Generation Partnership Project) or by 3GPP2. The cellular network may implement one or more radio technologies, such as GSM (Global System for Mobile communication), UMTS (Universal Terrestrial Mobile Telecommunications System) or Wideband CDMA (Code Division Multiple Access), CDMA2000, WiMaX, 3GPP SAE/LTE (Service Architecture Evolution/Long Term Evolution), and/or 3GPP LTE-Advanced. Accordingly, a V2V communication device as used in the illustrated concepts typically supports at least two different radio technologies: at least one first radio technology for accessing the cellular network, and at least one second radio technology for performing V2V communication.

The cellular network may comprise several network nodes which control communication with UEs. For example, the SAE/LTE architecture typically includes base stations, referred to as evolved Node B (eNB) and Mobility Management Entities (MMEs). For other radio technologies of the cellular network, similar types of nodes may be provided. In the scenarios as discussed in the following, such UEs which may communicate via the cellular network also include V2V communication devices.

To avoid collisions between V2V communication messages of an ITS application, e.g., between CAMs, the illustrated concepts involve allocating resources to a given V2V communication device, which are then used by this V2V communication device for sending V2V communication messages. Such resources can be time and/or frequency resources of the IEEE 802.11p radio technology or may be time and/or frequency resources in the radio spectrum assigned to the cellular network, e.g., of the LTE spectrum when for example using the LTE D2D radio technology. When the V2V communication device connects to a cell of the cellular network, channel information indicating the allocated resources is sent to the V2V communication device. Specifically, the channel information may be efficiently sent in the course of a handover (HO) to the cell. The channel information and resource allocation is valid at least in the area of the cell. However, the cells of the cellular network may also be organized into regions of multiple cells in which the same channel information and resource allocation is valid. The signalling overhead may then be reduced by sending the channel information only when the V2V communication device enters such region and connects to the first cell of the region.

FIG. 1 schematically illustrates an exemplary V2V communication scenario in which concepts in accordance with the illustrated embodiments may be applied. By way of example, FIG. 1 shows a first vehicle 10 and a second vehicle 20. The vehicles 10, 20 may be road vehicles, such as automobiles or motorcycles, for passenger transport and/or for cargo transport. The first vehicle 10 is equipped with a first V2V communication device (V2V-CD) 100, and the second vehicle 20 is equipped with a second V2V communication device (V2V-CD) 100'. The V2V communication devices 100, 100' support the above-mentioned first radio technology and second radio technology. Using the first radio technology, the first V2V communication device 100 and the second V2V communication device 100' can connect to the cellular network, in FIG. 1 represented by a base station 200-1 and a control node 210. Depending on the radio technology implemented by the cellular network, the base station 200 could for example be a GSM Radio Base Station (RBS), a UMTS Node B, or an LTE eNB. Similarly, the control node could be a GSM Base Station Controller (BSC), a UMTS Radio Network Controller (RNC), an LTE Mobility Management Entity (MME), or a Mobile Switching Center Server (MSC-S).

Using the second radio technology, the first V2V communication device 100 and the second V2V communication device 100' may perform V2V communication. This may include transmitting one or more V2V communication messages 50 from the first V2V communication device 100 to the second V2V communication device 100' and/or transmitting one or more V2V communication messages 50 from the second V2V communication device 100' to the first V2V communication device 100. Moreover, it is to be understood that further vehicles equipped with corresponding V2V communication devices could be present and could send or receive such V2V communication messages or connect to the cellular network. In such scenarios involving more than two V2V communication devices, the V2V communication messages may be broadcast to all other V2V communication devices within the communication range of the second radio technology. Further, it is possible to utilize forwarding of received V2V communication messages, thereby forming a multi-hop mesh type network of V2V communication devices. The V2V communication messages 50 may for example correspond to CAMs as defined in ETSI TS 102637-2.

As further illustrated, the V2V communication devices 100, 100' receive channel information 41, 42 from the cellular network. As mentioned above, the channel information indicates resources allocated to the respective V2V communication device 100, 100. That is to say, the channel information 41 indicates resources allocated to the V2V communication device 100, and the channel information 42 indicates resources allocated to the V2V communication device 100'. The channel information may then be applied by these V2V communication devices 100, 100' to send the V2V communication messages 50 on the indicated resources. By allocating different resources to the V2V communication devices 100, 100' colliding transmission attempts can be avoided.

The allocation of different resources may be implemented on the basis of a Time Division Multiple Access (TDMA) and/or Frequency Division Multiple Access (FDMA) scheme, by supplementing the radio technology for V2V communication with TDMA and/or FDMA mechanisms. For example, time slots could be defined for the IEEE 802.11p radio technology and allocated to different V2V communication devices. The duration of such time slots may be defined to be equal to 1 ms, thereby achieving a conformity with existing cellular radio technologies.

The channel information 41, 42 may also include other configuration parameters for controlling the transmission of V2V communication devices, e.g., an indication of resources to be monitored for receiving the V2V communication messages 50, a rate of sending the V2V communication messages 50, a transmit power to be used for sending the V2V communication messages 50, or the like.

As mentioned above, the channel information with the indicated allocated resources and optional other configuration parameters may be valid in a region corresponding to multiple cells of the cellular network. Such region may also be referred to as ITS region. A corresponding exemplary scenario is illustrated in FIG. 2.

Figure 2:
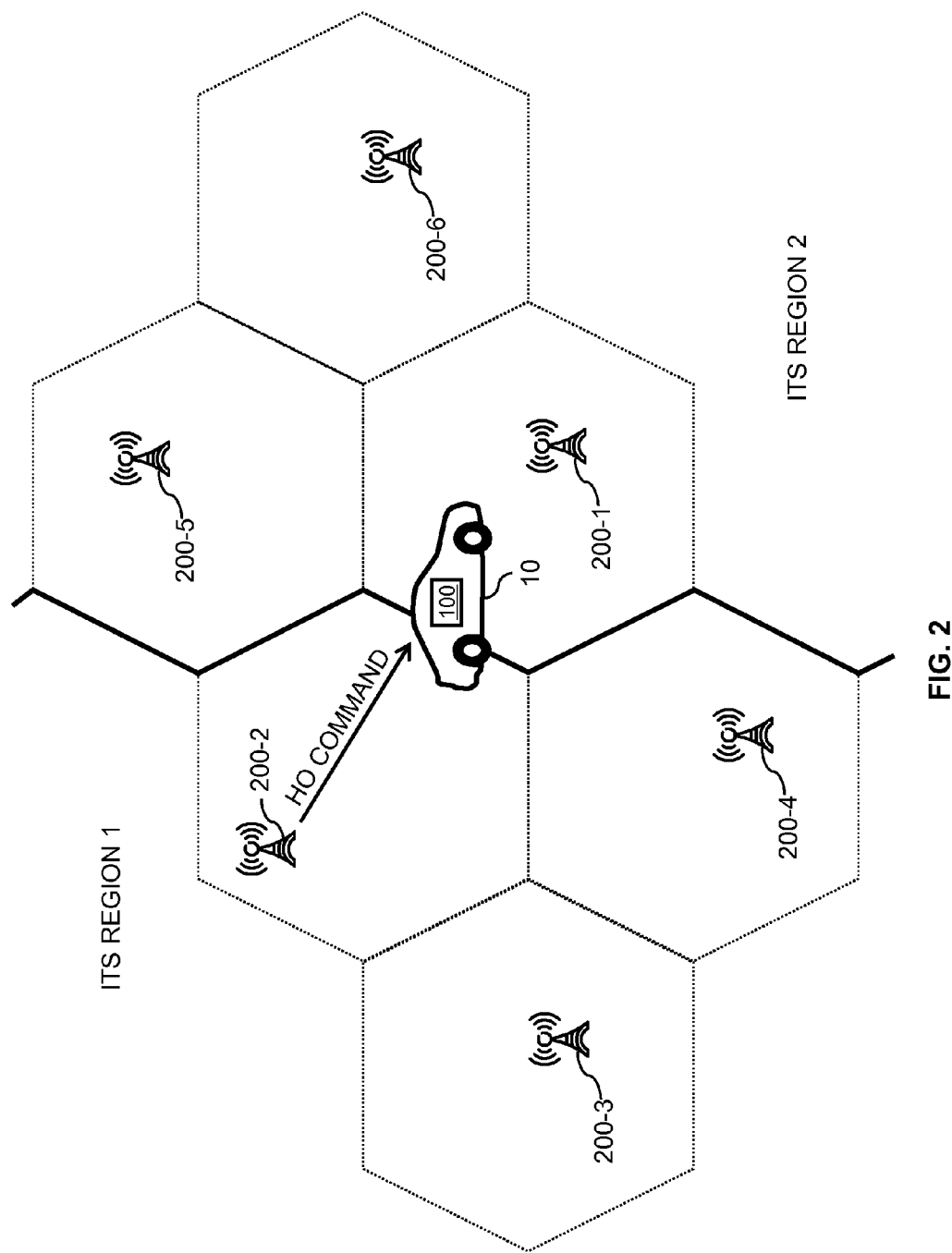
FIG. 2 schematically illustrates a change between ITS regions in accordance with an embodiment of the invention.

FIG. 2 shows a scenario in which the vehicle 10 moves from one cell of the cellular network, served by base station 200-2, to another cell of the cellular network, served by base station 200-1. Due to the change of cells, the V2V communication device 100 of the vehicle 10 is handed over from the cell of base station 200-2 to the cell of base station 200-1. The cell of base station 200-2 may also be referred to as a source cell of the HO, and the cell of base station 200-1 may also be referred to as a target cell of the HO. Execution of the HO is initiated by a HO command to the V2V communication device 100 in the vehicle 10. As illustrated, this HO command may be sent by the base station 200-2 of the source cell.

As further illustrated, the cell of base station 200-2 and the cell of base station 200-1 belong to different ITS regions. More specifically, the cell of base station 200-2, and the cells of base stations 200-3, 200-4 belong to a first ITS region (ITS region 1), while the cell of base station 200-1, and the cells of base stations 200-5, 200-6 belong to a second ITS region (ITS region 2).

Accordingly, in the scenario of FIG. 2 the vehicle 10 with the V2V communication device 100 not only moves between different cells of the cellular network, but also between different ITS regions. These ITS regions may for example use a different allocation of resources for sending the V2V messages 50. Also other configuration parameters may differ between these ITS regions. In some cases, even the radio technology for V2V communication could differ between these ITS regions. For example, one ITS region could use the IEEE 802.11p radio technology and the other ITS region could use LTE D2D. Upon entry into the new ITS region, the V2V communication device 100 in the vehicle is provided with correspondingly updated channel information, which is included in the HO command transmitted from the cellular network to the V2V communication device 100. The V2V communication device 100 may then immediately continue with the transmission of the V2V communication messages 50, using the updated channel information. Further, the channel information may be indicated in a reliable manner, taking advantage of protection mechanisms implemented for reliable transmission of the HO command.

In the following, the concepts as outlined above will be described in more detail with reference to a scenario in which the cellular network supports LTE radio access technology. And by referring to exemplary HO procedures as specified for the LTE radio technology.

Figure 3:
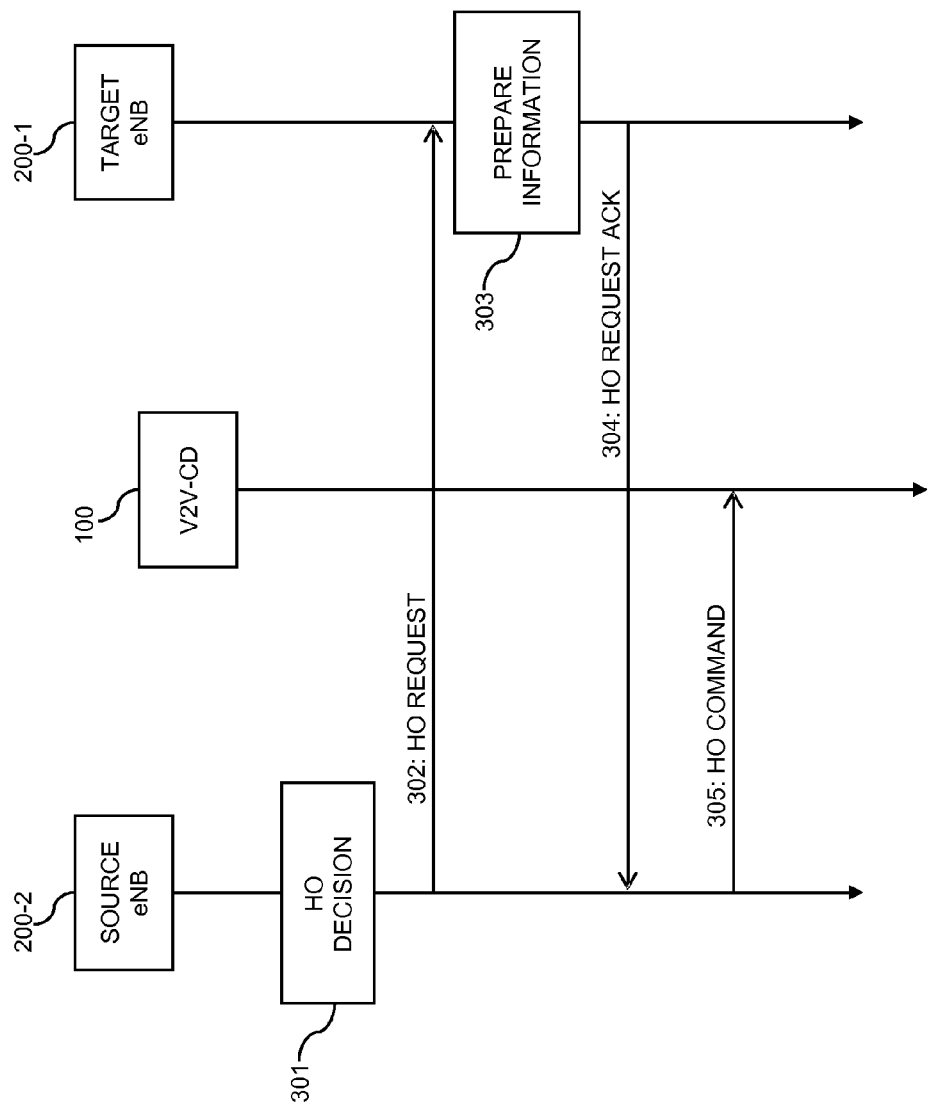
FIG. 3 shows a signalling diagram for illustrating exemplary handover related procedures in accordance with an embodiment of the invention.

FIG. 3 illustrates HO procedures which are based on the LTE X2 interface between eNBs. In these procedures, the source base station 200-2 (i.e., source eNB) and the target base station 200-1 (i.e., target eNB) communicate via the X2 interface to prepare the HO of the V2V communication device 100 and initiate execution of the HO.

In the procedures of FIG. 3, a HO decision of the source base station 200-2 is illustrated by step 301. The HO decision is typically based on measurements performed by the UE (in this case the V2V communication device 100) and/or by the network. In the procedures of FIG. 3, it is assumed that the evaluation of such measurements resulted in the decision to perform the HO from the source base station 200-2 to the target base station 200-1.

In response to the HO decision 301, the source base station 200-2 sends a HO request 302 to the target base station 200-1, e.g., as specified in 3GPP Technical Specification (TS) 36.300 V11.5.0. The HO request 302 includes information for enabling the target base station 200-1 to prepare for the HO, e.g., information on the current radio configuration of the V2V communication device 100.

Upon receiving the HO request 302 and having detected that the UE to be handed over is a V2V communication device and that the cell change also corresponds to a change of ITS region, the target base station prepares information at step 303. For detecting the change of ITS region, the target base station 200-1 may for example evaluate a mapping of cell identifiers to ITS regions. The information prepared by the target base station 200-1 has the purpose of enabling the V2V communication device 100 to set up a radio connection to the cell of the target base station 200-1. In addition, the prepared information also includes the channel information to be applied by the V2V communication device in the new ITS region, i.e., in the ITS region 2.

The target base station 200-1 then sends HO request acknowledgement 304 to the source base station, e.g., as specified in 3GPP TS 36.300. The HO request acknowledgement 304 contains the information prepared by the target base station 200-1 at step 303. In particular, this information is included in a HO command prepared by the target base station 200-1. The HO command is contained in a transparent container of the HO request acknowledgement 304 and intended to be sent by the source base station 200-2 to the V2V communication device 100.

Having received the HO request acknowledgement 304, the source base station 200-2 proceeds by sending the HO command 305, as received in HO request acknowledgement 304, to the V2V communication device 100, thereby initiating execution of the HO. In accordance with 3GPP TS 36.300, the HO command 305 may be a Radio Resource Control (RRC) connection reconfiguration message and convey mobility control information to the V2V communication device 100, e.g., a random access channel allocation, a random access preamble, or other information for accessing the random access channel. In addition, the HO command indicates the channel information for V2V communication as valid in ITS region 2 to the V2V communication device 100.

Figure 4:
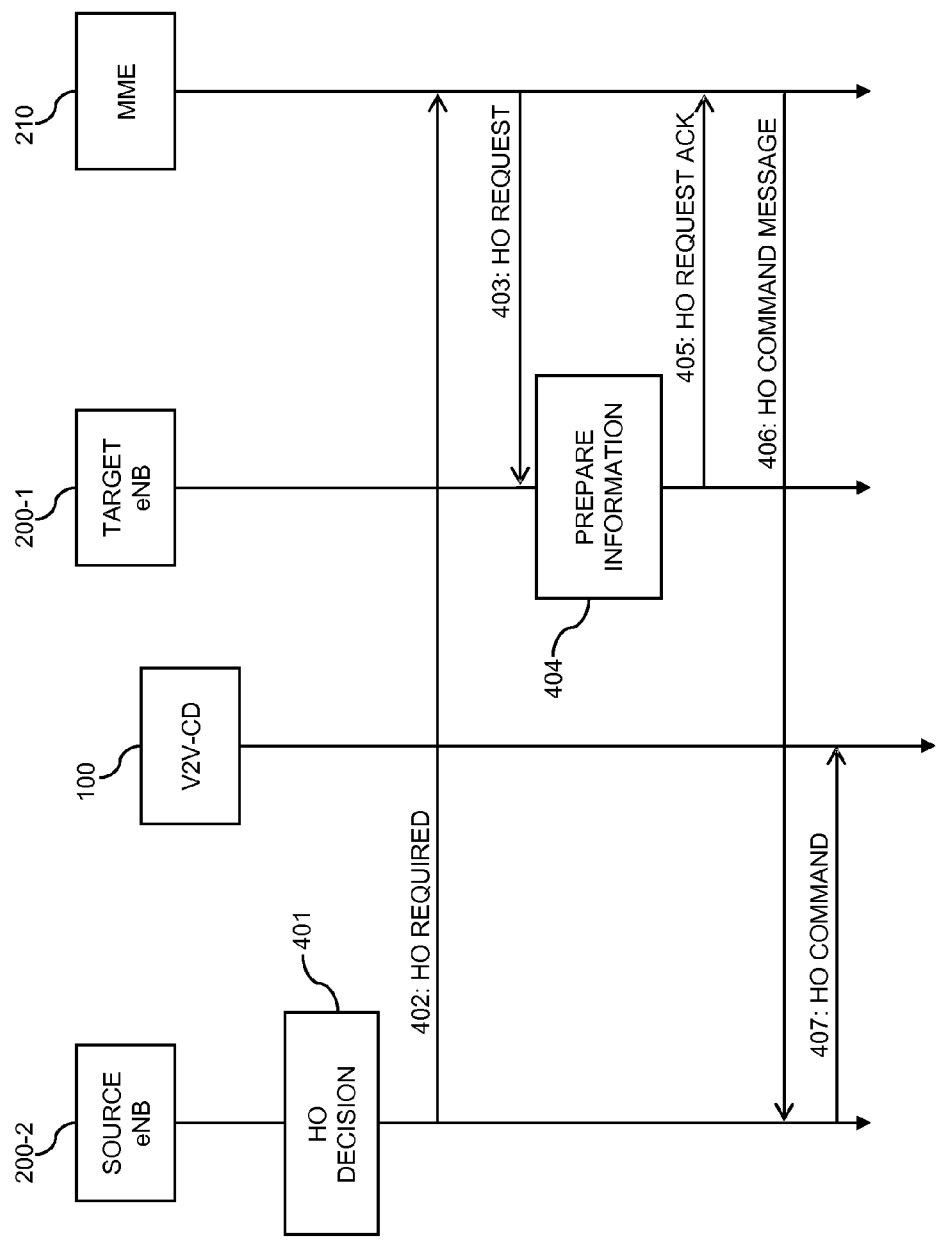
FIG. 4 shows a signalling diagram for illustrating further exemplary handover related procedures in accordance with an embodiment of the invention.

FIG. 4 illustrates HO procedures which are based on the LTE S1 interface between the eNB and MME. In these procedures, the source base station 200-2 (i.e., source eNB) and the target base station 200-1 (i.e., target eNB) communicate via the S1 interface with the MME 210 to prepare the HO of the V2V communication device 100 and initiate execution of the HO.

In the procedures of FIG. 4, a HO decision of the source base station 200-2 is illustrated by step 401. The HO decision is typically based on measurements performed by the UE (in this case the V2V communication device 100) and/or by the network. In the procedures of FIG. 4, it is assumed that the evaluation of such measurements resulted in the decision to perform the HO from the source base station 200-2 to the target base station 200-1.

In response to the HO decision 401, the source base station 200-2 sends a HO required message 402 to the MME 210, e.g., as specified in 3GPP TS 36.300. The HO required message 402 includes information for enabling the target base station 200-1 to prepare for the HO, e.g., information on the current radio configuration of the V2V communication device 100. The MME 210 then includes the received information into a HO request 403 to the target base station 200-1, e.g., as specified in 3GPP TS 36.300.

Upon receiving the HO request 403 and having detected that the UE to be handed over is a V2V communication device and that the cell change also corresponds to a change of ITS region, the target base station 200-1 prepares information at step 404. For detecting the change of ITS region, the target base station 200-1 may for example evaluate a mapping of cell identifiers to ITS regions. The information prepared by the target base station 200-1 has the purpose of enabling the V2V communication device 100 to set up a radio connection to the cell of the target base station 200-1. In addition, the prepared information also includes the channel information to be applied by the V2V communication device in the new ITS region, i.e., in the ITS region 2.

The target base station 200-1 then sends HO request acknowledgement 405 to the MME 210, e.g., as specified in 3GPP TS 36.300. The HO request acknowledgement 405 contains the information prepared by the target base station 200-1 at step 404. In particular, this information is included in a HO command prepared by the target base station 200-1. The HO command is contained in a transparent container of the HO request acknowledgement 404 and intended to be sent by the source base station 200-2 to the V2V communication device 100. The MME 210 then includes the received information into a HO command message 406, which is sent to the target base station 200-1, e.g., as specified in 3GPP TS 36.300.

Having received the HO command message 406, the source base station 200-2 proceeds by sending the HO command 407, as forwarded in HO command message 406, to the V2V communication device 100, thereby initiating execution of the HO. In accordance with 3GPP TS 36.300, the HO command 406 may be an RRC connection reconfiguration message and convey mobility control information to the V2V communication device 100, e.g., a random access channel allocation, a random access preamble, or other information for accessing the random access channel. In addition, the HO command indicates the channel information for V2V communication as valid in ITS region 2 to the V2V communication device.

Figure 5:
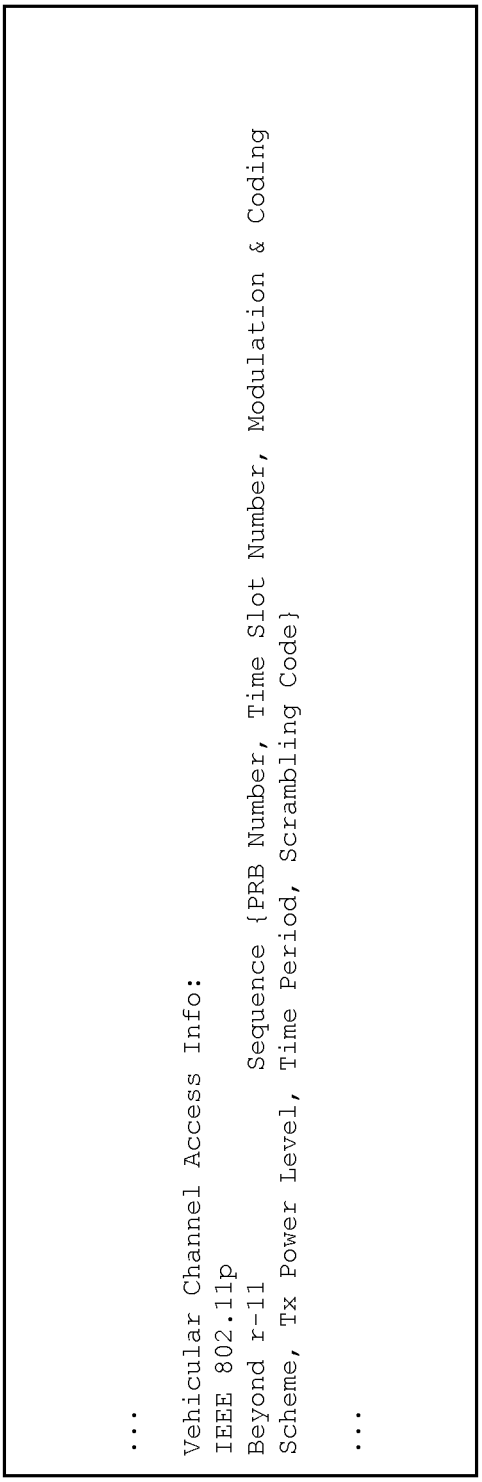
FIG. 5 shows an example of channel information for V2V communication as included in a handover command.

Accordingly, the HO command, which is prepared by a node of the target cell and is sent to the V2V communication device 100 via a node of the source cell, may be used to provide the V2V communication device with the channel information for V2V communication in the new ITS region. FIG. 5 illustrates a corresponding information element, which may for example be supplemented in the format of the RRCConnectionReconfiguration message for initiating execution of a handover as defined in 3GPP TS 36.331 V11.3.0, section 6.2.2. As can be seen, the channel information may for example specify the resource allocation in terms Physical Resource Block (PRB) number and/or time slot number. In addition, further configuration parameters may be specified, such as a modulation and coding scheme, a transmit (Tx) power, and/or a scrambling code. Further, also a time period may be indicated to specify how long the indicated channel information is valid.

In the procedures of FIG. 4 the target base station 200-1 determines the channel information for V2V communication to be sent to the V2V communication device 100. This allows for efficiently integrating this process with the processes for determining the mobility control information for enabling the V2V communication device to connect to the target cell. Further, no modified functionalities in the MME 210 are needed, which merely needs to transparently forward the prepared HO command. However, in modified solutions also the MME 210 could determine the channel information for V2V communication and modify the HO command prepared by the target base station 200-1 accordingly, before forwarding it to the source base station 200-2.

In the procedures of FIGS. 3 and 4, the allocation of resources for V2V communication is accomplished by a node of the cellular network, in particular by the base station 200-1 of the target cell of the HO. Various algorithms may be applied for the allocation, e.g., fair scheduling or the like. The scheduling may also be based on various types of information on the relevant region as available in the cellular network, such as density of V2V communication devices, average speed of such V2V communication devices, local accident risk levels, or the like. The V2V communication device 100 may utilize the indicated allocation while remaining in the same cell, and may also continue to utilize this allocation in other cells of the same ITS region. The same applies for other configuration parameters indicated in the channel information.

In some scenarios, the amount of available resources for allocation may be smaller than the number of V2V communication devices requiring allocation of resources for V2V communication. In such cases, the same resources may be allocated to multiple V2V communication devices. To reduce the risk of colliding transmission attempts on such multiply allocated resources, the re-allocation of the same resources may be accomplished in a circular way. That is to say, a first set of resources is allocated to a first V2V communication device requiring resource allocation, a second set of resources is allocated to a second V2V communication device requiring resource allocation, and so forth, until all available resources are allocated. For a still further V2V communication device requiring resource allocation, the allocation may be continued starting again from the first set of resources, and so forth. In typical usage scenarios, e.g., in a highway scenario with vehicles moving at high speed in a uniform direction, the probability of interfering transmissions by two V2V communication devices is low. In particular, V2V communication devices entering the cell at approximately the same time will be allocated to different resources. Since it can be expected that such V2V communication devices are close to each other and that this will not change significantly while the resource allocation is valid, the allocation of different resources helps to avoid colliding transmission attempts. On the other hand, if V2V communication devices enter the cell with a certain delay therebetween, they may be allocated to the same resources. However, due to the typical movement of the V2V communication devices, there is only a limited risk of such V2V communication devices getting close to each other while the resource allocation is valid. This effect may further be supported by configuring a reduced Tx power for V2V communication devices using multiply allocated resources. In a similar way, different modulation and coding schemes or scrambling codes could be used to avoid interference.

In some scenarios, the indicated channel information may also be later modified by the cellular network while the V2V communication device is still in the same cell or ITS region, e.g., in order to newly allocate resources so that the risk of colliding transmissions is reduced. For example, the initially indicated channel information may be specified to be valid only for a certain time period, and expiry of this time period may cause the V2V communication device to request new channel information from the cellular network.

Accordingly, the V2V communication device may utilize the indicated channel information until new channel information is indicated, e.g., upon entry into a new ITS region or when a specified validity time period of the channel information expires and the V2V communication device obtains new channel information.

Figure 6:
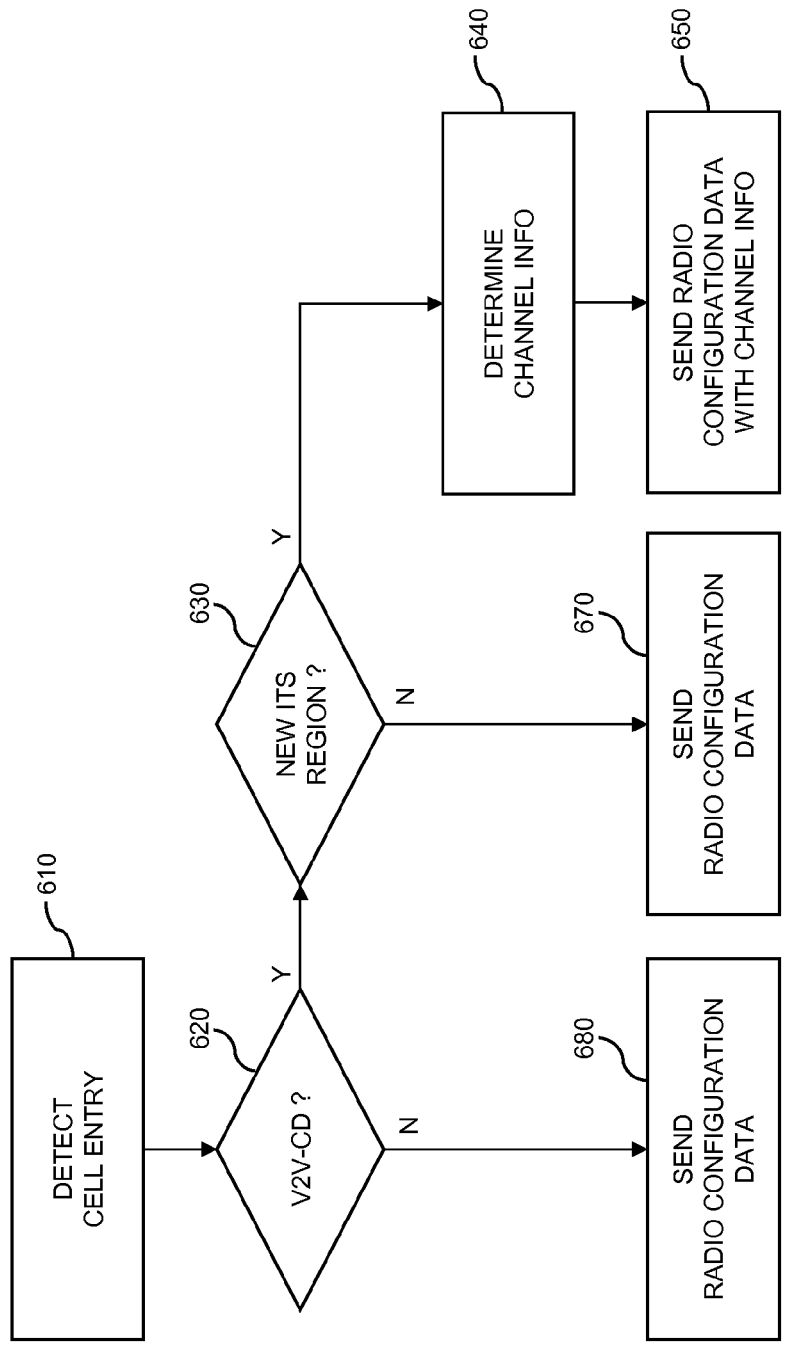
FIG. 6 shows a flowchart for illustrating a method according to an embodiment of the invention.

FIG. 6 shows a flowchart for illustrating a method which may be used for implementing the above concepts in a node of a cellular network, i.e., a node of the cellular network or a node connected to the cellular network. The method may be used for controlling V2V communication as performed by at least one V2V communication device with access to the cellular network, e.g., the V2V communication device 100 or 100'. The V2V communication device is assumed to be located onboard a vehicle, e.g., a road vehicle for passenger and/or cargo transport. The node may correspond to an LTE base station, i.e., an eNB, to some other node of the cellular network involved in controlling handovers, e.g., a control node such as an MME, RNC, or BSC.

The cellular network may implement a first radio technology, e.g., GSM, UMTS or Wideband CDMA, CDMA2000, WiMaX, 3GPP SAE/LTE, and/or 3GPP LTE-Advanced. The V2V communication, in particular transmission of V2V messages such as CAMs, may be implemented using a second radio technology, which is different from the radio technology of the cellular network, e.g., an ad-hoc network technology for V2V communication, such as defined by IEEE 802.11p, or LTE D2D radio technology.

At steps 610 and 620, the node detects entry of a V2V communication device into a cell of the cellular network. In particular, step 610 may be used to detect cell entry of a UE, e.g., when the UE is handed over to the cell or otherwise attaches to the cell. At step 620, the node may detect whether the entering UE corresponds to a V2V communication device, e.g., using a device category mapped to a subscriber identity, e.g., to an International Mobile Subscriber Identity (IMSI) or Temporary Mobile Subscriber Identity (TMSI), associated with the UE. Such mapping may for example be available from a database implemented in the cellular network. If the detected cell entry corresponds to a V2V communication device, the method proceeds with step 630, as indicated by branch "Y".

At step 630, the node may further perform a check whether the cell entry also corresponds to a region in which new channel information for V2V communication is valid, such as a new ITS region as explained in connection with FIG. 2. Accordingly, the cells of the mobile network may be organized in regions in which the same channel information is applicable, and the cell into which entry is detected at step 610 may be that cell of one of the regions, to which the V2V communication device first connects when entering the region. For detecting entry into the region, node may for example evaluate a mapping of cell identifiers to such regions. In the case of a HO to the cell, the node may check if the source cell of the HO corresponds to another region than the target cell.

If the cell entry corresponds to entry into a region with new valid channel information, the method may proceed with step 640, as indicated by branch "Y".

At step 640, the node determines channel information for V2V communication. The may in particular involve that the node allocates resources to the V2V communication device, to be used for sending of V2V communication messages by the V2V communication device, and determines the channel information to indicate the allocated resources. In some scenarios, the resources indicated in the channel information may be located in a radio spectrum which is assigned to the radio technology of the cellular network, e.g., when performing the V2V communication on the basis of the LTE D2D technology. The channel information may also further indicate resources to be monitored by the V2V communication device for receiving V2V communication messages, or other configuration parameters for V2V communication.

At step 650, the node sends the channel information indicating the allocated resources to the V2V communication device. This may in particular be accomplished using HO related signalling, together with radio configuration data for enabling the V2V communication device to connect to the target cell of the HO. For example, the cell to which entry is detected at step 610 may be a target cell of a HO from a source cell, and the node may be responsible for controlling the target cell of the HO. The node may then prepare a HO command to be sent to the V2V communication device and include the HO command into a HO preparation message to a node of the source cell, which may then forward the HO command to the V2V communication device. Examples of such procedures are explained in connection with FIGS. 3 and 4.

If the check of 630 reveals that the V2V communication device did not enter a region with new valid channel information, the method proceeds with step 670, as indicated by branch "N". At step 670, in the node sends radio configuration data to the UE for enabling the UE to connect to the cell, e.g., as in a conventional HO procedure. Similarly, if the check of 620 reveals that the UE entering the cell is not a V2V communication device, the method proceeds with step 680, as indicated by branch "N". At step 680, the node sends radio configuration data to the UE, for enabling the UE to connect to the cell, e.g., as in a conventional HO procedure.

Figure 7:
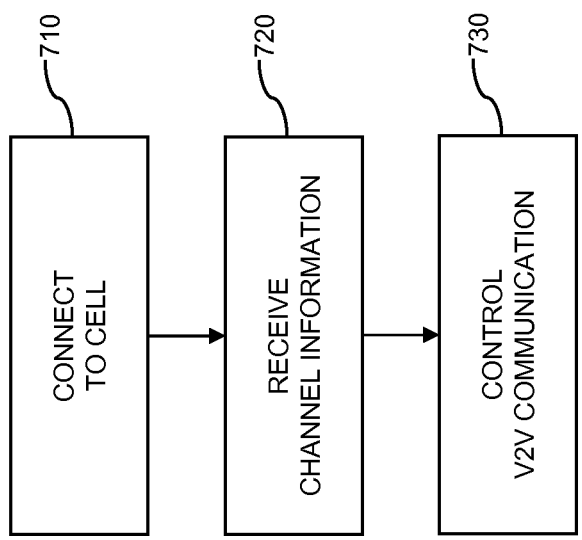
FIG. 7 shows a flowchart for illustrating a further method according to an embodiment of the invention FIG. 8 schematically illustrates a V2V communication device according to an embodiment of the invention.

FIG. 7 shows a flowchart for illustrating a method which may be used for implementing the above concepts in a V2V communication device with access to a cellular network, e.g., the V2V communication device 100 or 100'. The V2V communication device is assumed to be located onboard a vehicle, e.g., a road vehicle for passenger and/or cargo transport.

The cellular network may implement a first radio technology, e.g., GSM, UMTS or Wideband CDMA, CDMA2000, WiMaX, 3GPP SAE/LTE, and/or 3GPP LTE-Advanced. The V2V communication, in particular transmission of V2V messages such as CAMs, may be implemented using a second radio technology, which is different from the radio technology of the cellular network, e.g., an ad-hoc network technology for V2V communication, such as defined by IEEE 802.11p, or LTE D2D radio technology.

At step 710, the V2V communication device connects to a cell of the cellular network. In some scenarios, the cells of the mobile network are organized in regions in which the same channel information for V2V communication is applicable. The cell to which the V2V communication device connects may then correspond to that cell of one of the regions, to which the V2V communication device first connects when entering the region.

At step 720, the V2V communication device receives channel information for V2V communication from the cellular network. The channel information indicates resources which are allocated to the V2V communication device for sending of V2V communication messages, e.g., CAMs. In some scenarios, the resources indicated in the channel information may be located in a radio spectrum which is assigned to the radio technology of the cellular network, e.g., when performing the V2V communication on the basis of the LTE D2D technology. The channel information may also further indicate resources to be monitored by the V2V communication device for receiving V2V communication messages, or other configuration parameters for V2V communication. The channel information may be received in a HO command from the cellular network, e.g., as explained in connection with FIGS. 2, 3, and 4.

At step 730, the vehicle-to-vehicle communication device controls transmission of V2V communication messages. This is accomplished in accordance with the channel information received at step 720.

Figure 8:
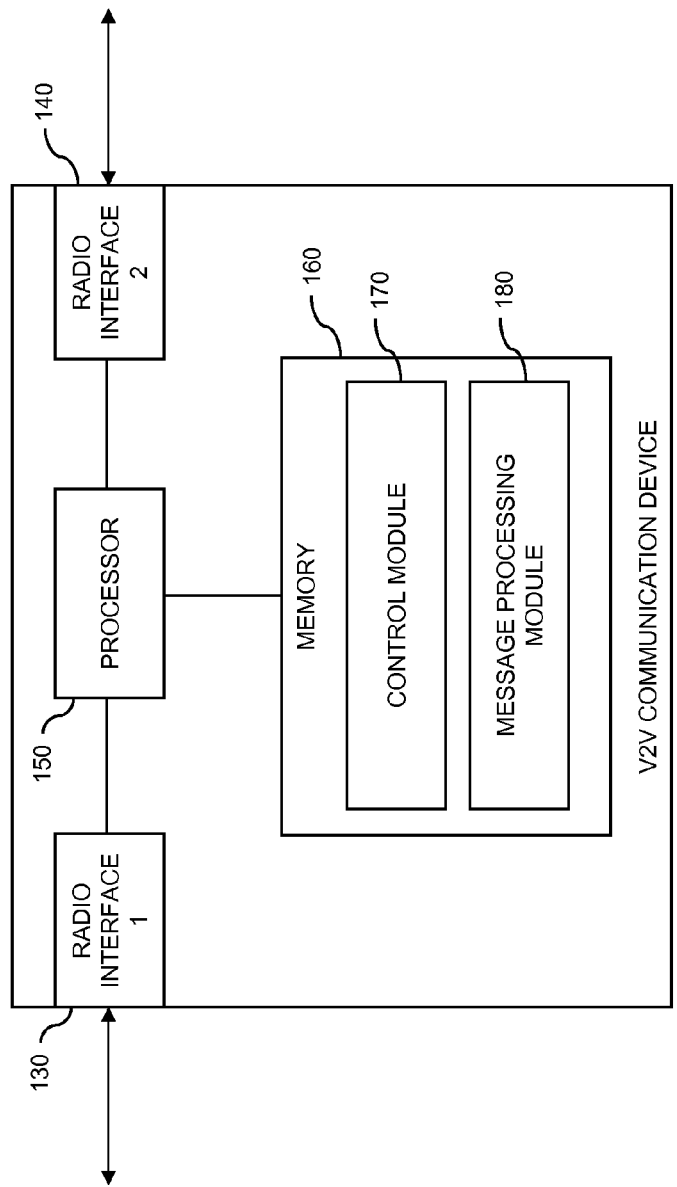

FIG. 8 illustrates an exemplary implementation of a V2V communication device. The V2V communication device of FIG. 4 may for example correspond to the V2V communication devices 100 as illustrated in FIGS. 1, 2, 3, and 4. The V2V communication device may be mounted onboard a vehicle, e.g., a road vehicle for passenger and/or cargo transport.

In the illustrated example, the V2V communication device includes a first radio interface 130 for communication with one or more other V2V communication devices. As mentioned above, this communication may utilize an ad-hoc network in accordance with IEEE 802.11p or other radio technology for V2V communication, e.g., based on the LTE D2D radio technology. Further, the V2V communication device includes a second radio interface 140 for communication with a cellular network. As mentioned above, the cellular network may support one or more cellular network radio technologies, e.g., GSM, UMTS or Wideband CDMA, CDMA2000, LTE, and/or LTE-Advanced.

Further, the V2V communication device includes one or more processor(s) 150 coupled to the interfaces 130, 140 and a memory 160 coupled to the processor 150. The memory 160 may include a read-only memory (ROM), e.g., a flash ROM, a random-access memory (RAM), e.g., a dynamic RAM (DRAM) or static RAM (SRAM), a mass storage, e.g., a hard disk or solid state disk, or the like. The memory 160 includes suitably configured program code to be executed by the processor(s) 150 so as to implement the above-described functionalities of the V2V communication device. More specifically, the program code in the memory 160 may include a control module 170 so as to implement the above-described functionalities of controlling the transmission of V2V messages on the resources indicated in the channel information. Further, the program code in the memory 160 may also include a message processing module 180 so as to implement the above-mentioned functionalities for receiving the channel information, e.g., in a HO command.

It is to be understood that the structure as illustrated in FIG. 8 is merely schematic and that the V2V communication device may actually include further components which, for the sake of clarity, have not been illustrated, e.g., further interfaces such as an interface with respect to vehicle systems. Also, it is to be understood that the memory 160 may include further types of program code modules, which have not been illustrated, e.g., program code modules for implementing known functionalities of a V2V communication device. According to some embodiments, also a computer program product may be provided for implementing functionalities of the V2V communication device, e.g., in the form of a medium storing the program code to be stored in the memory 160.

Figure 9:
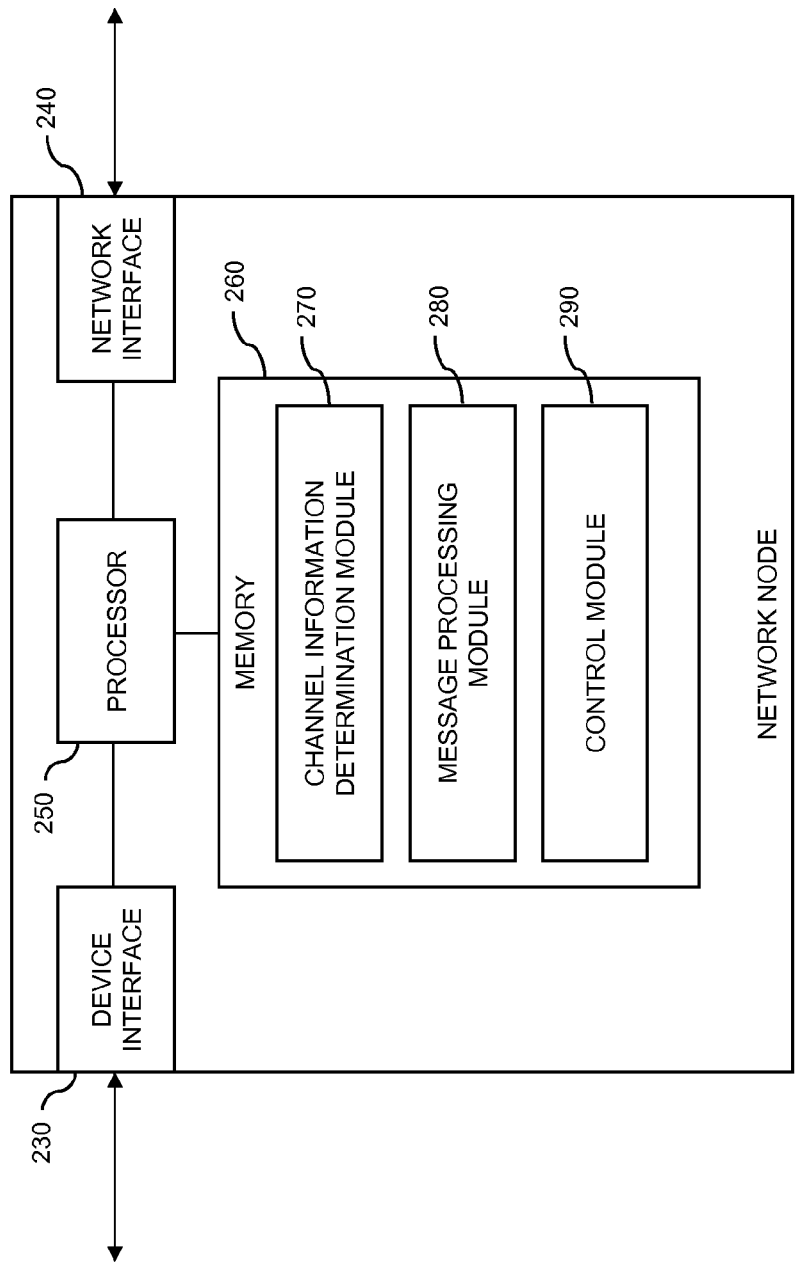
FIG. 9 schematically illustrates a cellular network node according to an embodiment of the invention.

FIG. 9 illustrates an exemplary implementation of a node for a cellular network. The node may correspond to a base station of the cellular network, e.g., to an eNB. However, similar functionalities could also be implemented in other nodes of the cellular network, e.g., in control nodes of the cellular network, such as an MME. The node may be configured to provide V2V communication devices connected to the cellular network with channel information for V2V communication. As mentioned above, this V2V communication may utilize an ad-hoc network in accordance with IEEE 802.11p or other radio technology for V2V communication, e.g., based on the LTE D2D radio technology.

In the illustrated example, the node includes a device interface 230 for communication with one or more V2V communication devices connected to the cellular network In addition, the node may include a network interface 240 for communication with other nodes of the cellular network. If the node implements a base station of the cellular network, the device interface may correspond to a radio interface based on a radio technology supported by the cellular network. If the node implements a control node of the cellular network, the device interface may provide a direct or indirect connection to one or more base stations of the cellular network, which in turn may provide a radio interface to one or more V2V communication devices.

Further, the node includes one or more processor(s) 250 coupled to the interfaces 230, 240 and a memory 260 coupled to the processor 250. The memory 260 may include a ROM, e.g., a flash ROM, a RAM, e.g., a DRAM or SRAM, a mass storage, e.g., a hard disk or solid state disk, or the like. The memory 260 includes suitably configured program code to be executed by the processor(s) 250 so as to implement the above-described functionalities for providing one or more V2V communication devices with channel information for V2V communication. More specifically, the program code in the memory 260 may include a channel information determination module 270 for determining the channel information for V2V communication to be provided to the V2V communication device(s) and performing the resource allocation. Further, the program code in the memory 260 may include a message processing module 280, e.g., for generating messages used for sending the control data to the V2V communication device(s), e.g., using HO signalling as explained above. Further, the program code in the memory 260 may include a control module 290, e.g., for implementing generic control functionalities of the node.

It is to be understood that the structure as illustrated in FIG. 9 is merely schematic and that the node may actually include further components which, for the sake of clarity, have not been illustrated, e.g., further interfaces. For example, multiple network interfaces could be provided which are configured to allow communication with different types of other nodes. Also, it is to be understood that the memory 260 may include further types of program code modules, which have not been illustrated, e.g., program code modules for implementing known functionalities of a base station, such as an eNB, or control node, such as an MME.

According to some embodiments, also a computer program product may be provided for implementing functionalities of the node, e.g., in the form of a medium storing the program code to be stored in the memory 260.

As can be seen, the concepts as described above may be used for efficiently controlling V2V communication. Specifically, V2V communication may be enabled with a low latency when entering a region with a given configuration to be used for V2V communication. Further, the signalling overhead can be kept low, thereby allowing for efficient usage of resources of the cellular network and low energy consumption in the controlled V2V communication devices.

It is to be understood that the examples and embodiments as explained above are merely illustrative and susceptible to various modifications. For example, the concepts could be used in connection with various types of cellular networks, e.g., including the examples of cellular networks as mentioned herein, but also other types of cellular networks. Depending on the implementation of such other types of cellular networks, also other types of procedures may be utilized for conveying the channel information to the V2V communication device, e.g., other types of HO procedures. Also HO procedures between different radio technologies could be used.

Moreover, it is to be understood that the above concepts may be implemented by using correspondingly designed software to be executed by one or more processors of an existing device, or by using dedicated device hardware. Also, the nodes as described herein may be implemented by a single device or by multiple devices, e.g., a device cloud or system of cooperating devices.

The invention claimed is:

1. A method for controlling vehicle-to-vehicle communication, the method comprising:
    connecting, by a vehicle-to-vehicle (V2V) communication device associated with a first vehicle and using a first radio technology and a first radio interface, the V2V communication device associated with the first vehicle to a node servicing a first cell of an Intelligent Transport System (ITS) region having a plurality of cells that are part of a cellular network;
    receiving, by the V2V communication device associated with the first vehicle, channel information from the cellular network, the channel information indicating a first resource which is allocated to the V2V communication device associated with the first vehicle for sending of V2V communication messages within the first cell;
    determining, by the V2V communication device, that the first vehicle has entered a second cell;
    applying the channel information to the second cell, wherein the second cell is another cell of the ITS region; and
    transmitting, by the V2V communication device associated with the first vehicle, and using the channel information and a second radio technology different from the first radio technology and a second radio interface different from the first radio interface, at least one V2V communication message to a V2V communication device associated with a second vehicle within the second cell.

2. The method according to claim 1, further comprising monitoring, by the V2V communication device associated with the first vehicle, a second resource for receiving V2V communication messages, wherein the second resource is indicated by the channel information.

3. The method according to claim 1, wherein the first radio technology comprises a radio technology selected from a Global System for Mobile communication (GSM) radio technology, a Universal Terrestrial Mobile Telecommunications System (UMTS), a Wideband Code Division Multiple Access (Wideband CDMA) radio technology, a WIMAX radio technology, and a 3GPP Service Architecture Evolution/Long Term Evolution (SAE/LTE) radio technology, and wherein the second radio technology different from the first radio technology is selected from an ad-hoc Wireless Local Area Network (WLAN) radio technology and a LTE Device-to-Device (D2D) technology.

4. The method according to claim 3, wherein the first resource indicated in the channel information is located in a radio spectrum which is assigned to the first radio technology.

5. The method according to claim 1, wherein the channel information is received by the V2V communication device associated with the first vehicle in a handover command from the cellular network.

6. A method for controlling vehicle-to-vehicle (V2V) communication, the method comprising:
    detecting, by a node of a cellular network servicing an Intelligent Transport System (ITS) region having a plurality of cells, entry of a V2V communication device associated with a first vehicle into a first cell of the ITS region;
    allocating, by the node, a first resource to the V2V communication device, the first resource being allocated for sending of V2V communication messages by the V2V communication device associated with the first vehicle while in any cell of the ITS region, wherein the V2V communication messages are to be sent using a first radio technology and a first radio interface, to a plurality of V2V communication devices associated with other vehicles; and
    transmitting radio frequency (RF) signals, using a second radio technology different from the first radio technology, to a second radio interface of the V2V communication device associated with the first vehicle different from the first radio interface, channel information indicating the first resource.

7. The method according to claim 6, wherein the channel information further indicates resources to be monitored by the V2V communication device associated with the first vehicle for receiving V2V communication messages from V2V communication devices associated with other vehicles.

8. The method according to claim 6, wherein the second radio technology comprises a radio technology selected from a Global System for Mobile communication (GSM) radio technology, a Universal Terrestrial Mobile Telecommunications System (UMTS), a Wideband Code Division Multiple Access (Wideband CDMA) radio technology, a WIMAX radio technology, and a 3GPP Service Architecture Evolution/Long Term Evolution (SAE/LTE) radio technology, and wherein the first radio technology different from the second radio technology is selected from an ad-hoc Wireless Local Area Network (WLAN) radio technology and a LTE Device-to-Device (D2D) technology.

9. The method according to claim 8,
wherein the first resource indicated in the channel information is located in a radio spectrum which is assigned to the second radio technology.

10. The method according to claim 6,
wherein the first cell is a target cell of a handover from a source cell and the method further comprises:
preparing by the node a handover command to be sent to the V2V communication device; and
sending by the node the handover command in a handover preparation message to a node servicing the source cell.

11. A device for vehicle-to-vehicle (V2V) communication, the device comprising:
a first radio interface for communication with a cellular network using a first radio technology;
a second radio interface different from the first radio interface for vehicle-to-vehicle (V2V) communication using a second radio technology different from the first radio technology; and
at least one processor,
wherein the at least one processor is configured to:
receive, while in a first cell of an Intelligent Transport System (ITS) region having a plurality of cells and via the first radio interface, channel information from the cellular network, the channel information indicating first resources which are allocated to the device for V2V communication for sending of vehicle-to-vehicle communication messages using the second radio technology within the first cell; and
determine that the device has entered a second cell;
apply the channel information to the second cell, wherein the second cell is another cell of the ITS region; and
transmit, using the channel information and the second radio technology, and via the second radio interface, V2V communication messages within the second cell.

12. The device according to claim 11,
wherein the channel information further indicates second resources to be monitored by the device for V2V communication for receiving V2V communication messages using the second radio technology.

13. The device according to claim 11,
wherein the first radio technology comprises a radio technology selected from a Global System for Mobile communication (GSM) radio technology, a Universal Terrestrial Mobile Telecommunications System (UMTS), a Wideband Code Division Multiple Access (Wideband CDMA) radio technology, a WIMAX radio technology, and a 3GPP Service Architecture Evolution/Long Term Evolution (SAE/LTE) radio technology, and wherein the second radio technology different from the first radio technology is selected from an ad-hoc Wireless Local Area Network (WLAN) radio technology and a LTE Device-to-Device (D2D) technology.

14. The device according to claim 13,
wherein the first resources indicated in the channel information are located in a radio spectrum which is assigned to the first radio technology.

15. The device according to claim 11,
wherein the at least one processor is configured to receive the channel information in a handover command from the cellular network.

16. A node for a cellular network, the cellular network comprising a plurality of cells and the node comprising:
an interface and at least one processor,
wherein the at least one processor is configured to:
detect entry of a vehicle-to-vehicle (V2V) communication device into a first cell of an Intelligent Transport System (ITS) region having a plurality of cells in the cellular network serviced by the node,
allocate a first resource to the V2V communication device, the first resource being allocated for sending of V2V communication messages by the V2V communication device, wherein the V2V communication messages are to be sent using a first radio technology and a first radio interface while in any cell of the ITS region, and
via the interface, send channel information indicating the allocated first resource to a second radio interface different from the first radio interface of the V2V communication device to transmit RF signals using a second radio technology different from the first radio technology.

17. The node according to claim 16,
wherein the channel information further indicates a second resource to be monitored by the V2V communication device for receiving V2V communication messages.

18. The node according to claim 16,
wherein the second radio technology comprises a radio technology selected from a Global System for Mobile communication (GSM) radio technology, a Universal Terrestrial Mobile Telecommunications System (UMTS), a Wideband Code Division Multiple Access (Wideband CDMA) radio technology, a WIMAX radio technology, and a 3GPP Service Architecture Evolution/Long Term Evolution (SAE/LTE) radio technology, and wherein the first radio technology different from the second radio technology is selected from an ad-hoc Wireless Local Area Network (WLAN) radio technology and a LTE Device-to-Device (D2D) technology.

19. The node according to claim 18,
wherein the first resource indicated in the channel information is located in a radio spectrum which is assigned to the second radio technology.

20. The node according to claim 16,
wherein the first cell is a target cell of a handover from a source cell and the at least one processor is further configured to:
prepare a handover command to be sent to the V2V communication device; and
via the interface, send the handover command in a handover preparation message to a node servicing the source cell.

* * * * *